Figure 1:
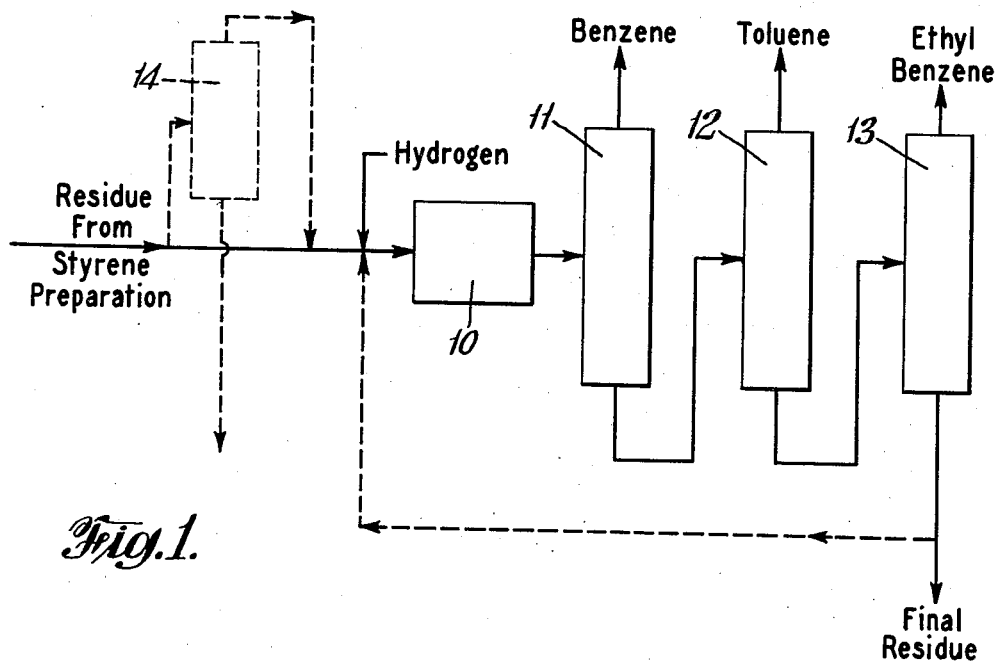

INVENTORS
GEORGE L. O'CONNOR
DAVID W. PECK
MARION A. ECCLES

BY J. Hart Evans
ATTORNEY

United States Patent Office 2,929,855
Patented Mar. 22, 1960

2,929,855
HYDROGENOLYSIS OF STYRENE RESIDUES

George L. O'Connor, South Charleston, David W. Peck, Charleston, and Marion A. Eccles, Nitro, W. Va., assignors to Union Carbide Corporation, a corporation of New York Application March 28, 1958, Serial No. 724,721

7 Claims. (Cl. 260—668)

This invention relates to a method for subjecting residues obtained as by-products in the manufacture of styrene to hydrogenolysis in order to recover therefrom such useful materials as benzene, toluene and ethylbenzene, as well as to an improvement in the manufacture of styrene from ethylbenzene that involves hydrogenolysis of hitherto unused oxidation and dehydration residues and a recycling of ethylbenzene recovered therefrom.

It is well known that in the manufacture of styrene from ethylbenzene by the steps of oxidizing ethylbenzene to acetophenone, hydrogenating acetophenone to methylphenylcarbinol, and dehydrating methylphenylcarbinol to styrene, millions of pounds of distillation residues are produced annually as by-products for which no uses, other than as a fuel, have been found. These residues are gross mixtures having broad distillation ranges and generally distilling above 200° C. They contain no significant proportion of any recoverable compound. One portion of this residue, referred to as the oxidation residue, is the material that remains after oxidation of ethylbenzene to acetophenone and the subsequent distillation, at reduced pressure, of the acetophenone from the reaction mixture. Another portion of the residue, referred to as the dehydration residue, is the material that remains after dehydration of methylphenylcarbinol to styrene and the subsequent distillation, at reduced pressure, of the styrene from the reaction mixture.

In accordance with the method of this invention, the residue formed as a by-product in the manufacture of styrene, i.e., the oxidation residue, the dehydration residue, or a mixture thereof, is subjected to hydrogenolysis at elevated temperature and pressure and the reaction products thereof are subjected to fractional distillation to obtain such valuable products as benzene, toluene and ethylbenzene. In accordance with one embodiment of the method of the invention, the yield of styrene prepared from ethylbenzene is significantly improved by subjecting the oxidation and dehydration residues to hydrogenolysis and recycling the recovered ethylbenzene for further processing to styrene. It is also within the scope of the invention to convert recovered benzene into ethylbenzene and recycle it to the oxidation step in the process of manufacturing styrene.

Inasmuch as the oxidation and dehydration residues are rather viscous and difficult to pump at room temperature, it is desirable to subject them to flash distillation under reduced or sub-atmospheric pressure unless equipment is available for maintaining them at elevated temperature prior to hydrogenolysis. If the residue is subjected to flash distillation, it is the distillate therefrom that is subjected to hydrogenolysis. Oxidation residues generally yield a larger proportion of distillate in a flash distillation and are more sensitive to hydrogenolysis than are the dehydration residues. Thus, for example, in one instance flash distillation yielded 82% distillate from a sample of oxidation residue but only 48% distillate from a sample of dehydration residue and the yield of benzene, toluene and ethylbenzene was 38% by hydrogenolysis of oxidation residue distillate and only 15% from hydrogenolysis of dehydration residue distillate, the percentages being based on the weight of original residues.

The temperature of hydrogenolysis may range between about 400 to 700° C., the range of 500 to 600° C. being preferred. The pressure in the reactor may be any elevated pressure above about 500 p.s.i., the preferred pressure range being between about 2000 and 4000 p.s.i. The rate of feed of residue, or residue distillate if preliminary flash distillation is employed, is preferably within the range of about 100 to 500 lbs./cu. ft. of reactor volume per hour. The preferred rate of feed of hydrogen for the hydrogenolysis is of the order of 4 to 10 pounds of hydrogen per 100 pounds of feed.

Within these ranges of conditions, conversions to benzene, toluene and ethylbenzene can be accomplished with optimum yields. It is to be understood, of course, that departures can be made from the conditions referred to without unduly harmful effects. Thus, for example, comparable results are obtainable by increasing the feed rate to 1000 or more lbs./cu. ft. of reactor volume per hour at temperatures within the upper portion of the 400 to 700° C. range. Conversely, a considerable reduction in the feed rate permits the use of lower temperatures of the order of 400° C. The hydrogen ratio can be increased to any desired amount, although no advantage is to be derived by increasing it above about 15 lbs. per 100 lbs. of residue. The hydrogen ratio should, however, not be reduced below about 2 lbs. per 100 lbs. of liquid feed in order to avoid formation of coke within the reactor.

Figure 2:
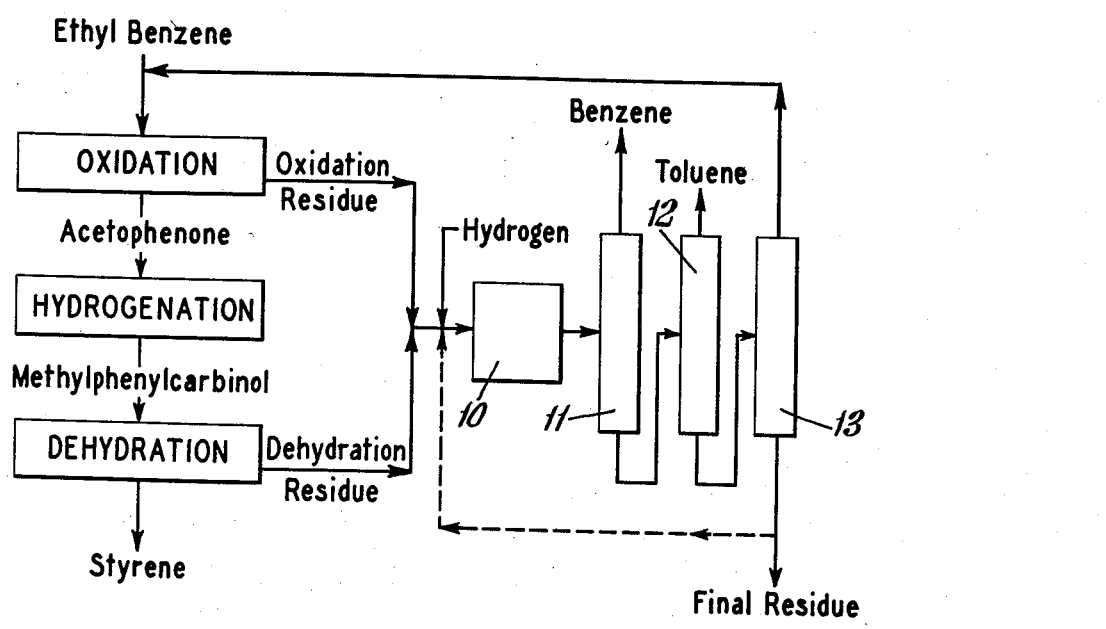

The method of the invention will become further apparent from the following examples included to illustrate the best modes now contemplated of practicing the invention as well as from the description made with reference to the accompanying drawing wherein:

Figure 1 is a flow diagram showing the steps involved in subjecting a residue to hydrogenolysis and separating benzene, toluene and ethylbenzene therefrom, and Figure 2 is a flow sheet of a method for the manufacture of styrene in which the residues of the process are subjected to hydrogenolysis for recovery and recycling of ethylbenzene.

Referring now to Figure 1, the residue from styrene manufacture is introduced, with hydrogen, into a reactor 10 for hydrogenolysis. The liquid product is subjected to distillation in stills 11, 12 and 13 for the separation and removal of benzene, toluene and ethylbenzene, respectively.

If desired, the residue from the still 13 may, as shown in dashed lines, be recycled for hydrogenolysis and the residue from the styrene preparation may, as also shown in dashed lines, be subjected to flash distillation in a still 14 before the distillate therefrom is introduced to the reactor 10.

Referring now to Figure 2, ethylbenzene is subjected to oxidation to form acetophenone and the oxidation residue remaining after distillation of the reaction products is removed from the process for hydrogenolysis in a reactor 10. The acetophenone is subjected to hydrogenation to form methylphenylcarbinol and the latter is subjected to dehydration to form styrene. The products of dehydration are distilled to recover the styrene and the remains form the dehydration residue which is introduced to the reactor 10 for hydrogenolysis.

It is to be understood of course that in this method either or both the oxidation and dehydration residues may be subjected to hydrogenolysis and that, if desired, the residue or residues may be preliminarily subjected to flash distillation at reduced pressure and the residue distillate therefrom subjected to hydrogenolysis.

Example 1

3.875 pounds per hour of ethylbenzene were subjected to oxidation to form acetophenone, the acetophenone was subjected to hydrogenation to form methylphenylcarbinol and the methylphenylcarbinol was subjected to dehydration to form styrene, the yield of styrene being 3 pounds per hour and the amount of oxidation and dehydration residues being 0.25 pound each per hour.

The mixture of oxidation and dehydration residues was then subjected to hydrogenolysis in a coiled stainless steel continuous reactor having an inside diameter of 3/16 inch, a length of 18 feet and a volume of 6 cubic inches. The reactor was maintained at 500° C. and at a pressure of 3000 p.s.i. The hydrogen ratio was 8 pounds per 100 pounds of residue and the residue feed rate was 0.5 pound per hour (equivalent to a feed rate of 144 pounds of residue per cubic foot of reactor volume per hour).

It was found that 0.43 pound per hour, or 86%, liquid product was recovered from the hydrogenolysis reactor and that upon distillation it yielded 0.015 pound per hour of benzene, 0.055 pound per hour of toluene, 0.13 pound per hour of ethylbenzene and 0.23 pound per hour of residue.

Upon recycling the 0.13 pound per hour of recovered ethylbenzene to the styrene process, it was found that the yield of styrene was increased by 0.1 pound per hour or an increase of 3.3%.

Example 2

A 1:1 mixture of oxidation residue and dehydration residue from the manufacture of styrene was continuously subjected to hydrogenolysis in the apparatus described in Example 1, at a temperature of 500° C. and a pressure of 3000 p.s.i., with 8 pounds hydrogen per 100 pounds of residue, and at a residue feed rate of 1.6 pounds per hour (equivalent to a feed rate of 460 pounds of residue per cubic foot of reactor volume per hour).

For each 100 pounds of residue subjected to the process, 85 pounds of liquid product were recovered. The liquid product was distilled to yield one pound of benzene, 7 pounds of toluene, 26 pounds of ethylbenzene and 51 pounds of residue.

Example 3

A sample of oxidation residue from the manufacture of styrene was flash distilled under reduced pressure to yield an 82% recovery of distillate. The pressure and temperatures involved were:

|  | Initial | Final |
|---|---|---|
| Pressure, mm | 1 | 40 |
| Head Temperature, ° C | 57 | 270 |
| Kettle Temperature, ° C | 111 | 375 |

The distillate was subjected to hydrogenolysis in the apparatus described in Example 1, at a temperature of 600° C. and a pressure of 3000 p.s.i., with hydrogen in a ratio of 8 pounds per 100 pounds of distillate, and at a distillate feed rate of 1.6 pounds per hour.

For each 82 pounds of distillate subjected to the process, 66 pounds of liquid product were recovered. The liquid product was distilled to yield 13 pounds of benzene, 5 pounds of toluene, 20 pounds of ethylbenzene and 28 pounds of residue.

Example 4

A sample of dehydration residue from the manufacture of styrene was flashed distilled under reduced pressure to yield a 48% recovery of distillate. The pressure and temperatures involved were:

|  | Initial | Final |
|---|---|---|
| Pressure, mm | 20 | 3 |
| Head Temperature, ° C | 47 | ab. 250 |
| Kettle Temperature, ° C | 119 | 320 |

The distillate was subjected to hydrogenolysis in the apparatus described in Example 1, at a temperature of 600° C. and a pressure of 3000 p.s.i., with hydrogen in a ratio of 8 pounds per 100 pounds of distillate and at a distillate feed rate of 1.6 pounds per hour.

For each 48 pounds of distillate subjected to the process, 42 pounds of liquid product were recovered. The liquid product was distilled to yield 3 pounds of benzene, 6 pounds of toluene, 8 pounds of ethylbenzene and 25 pounds of residue.

Example 5

A 1:1 mixture of oxidation residue and dehydration residue was flash distilled under reduced pressure to yield a 74% recovery of distillate. The pressure and temperatures involved were:

|  | Initial | Final |
|---|---|---|
| Pressure, mm | 3 | 6 |
| Head Temperature, ° C | 52 | 259 |
| Kettle Temperature, ° C | 124 | 350 |

The distillate was subjected to hydrogenolysis in the apparatus described in Example 1, at a temperature of 600° C. and a pressure of 3000 p.s.i., with hydrogen in a ratio of 8 pounds per 100 pounds of distillate and at a distillate feed rate of 1.6 pounds per hour.

For each 74 pounds of distillate subjected to the process, 61 pounds of liquid product were recovered. Distillation of the liquid product yielded 8 pounds of benzene, 8 pounds of toluene, 16 pounds of ethylbenzene and 29 pounds of residue.

Example 6

A sample of oxidation residue from the manufacture of styrene was continuously subjected to hydrogenolysis in the apparatus of Example 1, at a temperature of 500° C. and a pressure of 3000 p.s.i., with 9.7 pounds of hydrogen per 100 pounds of residue and at a feed rate of 120 pounds of residue per cubic foot of reactor volume per hour. For each 100 pounds of residue subjected to the process, 70 pounds of liquid product were recovered. This did not include considerable handling loss. The liquid product was distilled to yield 5 pounds of benzene, 4 pounds of toluene, 26 pounds of ethylbenzene and 35 pounds of residue.

The residue produced was recycled to the reactor at 600° C., 3000 p.s.i., with 8.3 pounds of hydrogen per 100 pounds of residue and at a feed rate of 105 pounds of residue per cubic foot of reactor volume per hour. Twenty-five pounds of liquid product were collected and distilled to yield 3 pounds of benzene, 3 pounds of toluene, 4 pounds of ethylbenzene and 15 pounds of residue.

Thus, a total of 45 pounds of benzene, toluene and ethylbenzene was obtained from 100 pounds of oxidation residue.

It is to be understood that numerous modifications will readily become apparent to those skilled in the art upon reading this description. All such modifications are intended to be included within the scope of the invention as defined in the appended claims.

We claim:

1. Method for preparing benzene, toluene and ethylbenzene from a distillation residue by-product obtained in the preparation of styrene from ethylbenzene by oxidation of ethylbenzene to acetophenone, hydrogenation of acetophenone to methylphenylcarbinol and dehydration of methylphenylcarbinol to styrene, which comprises subjecting said residue by-product to hydrogenolysis in a reactor at between about 400 and 700° C., and at a pressure above about 500 p.s.i., the feed rate of said residue being about 100 to 1000 pounds per cubic foot of reactor volume per hour.

2. Method defined in claim 1 wherein the residue by-product is subjected to flash distillation under subatmospheric pressure and the distillate therefrom is then subjected to hydrogenolysis.

3. Method defined in claim 1 wherein the residue subjected to hydrogenolysis is the oxidation residue from the step of oxidizing ethylbenzene to acetophenone.

4. Method defined in claim 1 wherein the residue subjected to hydrogenolysis is the dehydration residue from the step of dehydrating methylphenylcarbinol to styrene.

5. Method for preparing benzene, toluene and ethylbenzene from a distillation residue by-product obtained in the preparation of styrene from ethylbenzene by oxidation of ethylbenzene to acetophenone, hydrogenation of acetophenone to methylphenylcarbinol and dehydration of methylphenylcarbinol to styrene, which comprises continuously feeding said residue by-product, with between about 4 and 10 pounds hydrogen per 100 pounds of residue, to a reactor at between about 500 and 600° C. and at a pressure between about 2000 and 4000 p.s.i., the feed rate of said residue being about 100 to 1000 pounds per cubic foot of reactor volume per hour.

6. In a method of manufacturing styrene by the steps of oxidizing ethylbenzene to acetophenone, hydrogenating the acetophenone to methylphenylcarbinol and dehydrating the methylphenylcarbinol to styrene wherein distillation residues generally boiling above about 200° C. are formed as by-products, the improvement which comprises subjecting said residues to hydrogenolysis in a reactor at between about 400 and 700° C., and at a pressure above about 500 p.s.i., the feed rate of said residue being about 100 to 1000 pounds per cubic foot of reactor volume per hour, subjecting the products of said hydrogenolysis to fractional distillation for recovery of ethylbenzene, and recycling the recovered ethylbenzene for oxidation to acetophenone.

7. In a method of manufacturing styrene by the steps of oxidizing ethylbenzene to acetophenone, hydrogenating the acetophenone to methylphenylcarbinol and dehydrating the methylphenylcarbinol to styrene wherein distillation residues generally boiling above about 200° C. are formed as by-products, the improvement which comprises continuously feeding said residues, with between about 4 and 10 pounds hydrogen per 100 pounds of residue, to a reactor at between about 500 and 600° C. and at a pressure between about 2000 and 4000 p.s.i., the feed rate of said residue being about 100 to 1000 pounds per cubic foot of reactor volume per hour, subjecting the products of said treatment to fractional distillation for separate recovery of benzene, toluene and ethylbenzene, and recycling the recovered ethylbenzene for oxidation to acetophenone.

References Cited in the file of this patent

UNITED STATES PATENTS

| | | |
|---|---|---|
| 2,381,522 | Stewart | Aug. 7, 1945 |
| 2,468,759 | Johnson | May 3, 1949 |
| 2,728,795 | Armstrong et al. | Dec. 27, 1955 |
| 2,763,702 | Amos et al. | Sept. 18, 1956 |
| 2,797,245 | Haensel | June 25, 1957 |